(12) United States Patent
Jung et al.

(10) Patent No.: US 9,372,720 B2
(45) Date of Patent: Jun. 21, 2016

(54) MULTIMEDIA DATA PRE-PROCESSING ON IDLE CORE BY DETECTING MULTIMEDIA DATA IN APPLICATION

(75) Inventors: Dong-Heon Jung, Gyeongsan-si (KR); Soo-Mook Moon, Seoul (KR); Kue-Hwan Sihn, Hwaseong-si (KR)

(73) Assignees: SNU R&DB FOUNDATION, Seoul (KR); Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 13/311,670

(22) Filed: Dec. 6, 2011

(65) Prior Publication Data

US 2012/0185869 A1 Jul. 19, 2012

(30) Foreign Application Priority Data

Jan. 18, 2011 (KR) .................. 10-2011-0005142

(51) Int. Cl.
| | |
|---|---|
| *G06F 9/46* | (2006.01) |
| *G06F 9/48* | (2006.01) |
| *G06F 9/38* | (2006.01) |
| *G06K 9/00* | (2006.01) |
| *G06F 11/34* | (2006.01) |
| *G06F 17/30* | (2006.01) |

(52) U.S. Cl.
CPC ............ *G06F 9/4843* (2013.01); *G06F 9/3818* (2013.01); *G06F 9/3822* (2013.01); *G06F 11/3404* (2013.01); *G06F 17/30017* (2013.01); *G06K 9/00067* (2013.01); *G06K 9/00187* (2013.01)

(58) Field of Classification Search
CPC ..................................................... G06F 9/4843
USPC .............. 718/104, 105; 370/468; 379/265.09, 379/908; 348/5, 8; 707/913, E17.009, 707/999.107
See application file for complete search history.

(56) References Cited

U.S. PATENT DOCUMENTS

| | | | |
|---|---|---|---|
| 7,707,578 B1 * | 4/2010 | Zedlewski et al. ............. | 718/102 |
| 7,770,176 B2 * | 8/2010 | Maeda et al. .................. | 718/105 |
| 8,027,268 B2 * | 9/2011 | Preston et al. ................. | 370/252 |
| 2005/0172292 A1 * | 8/2005 | Yamada et al. ................ | 718/105 |
| 2006/0074895 A1 * | 4/2006 | Belknap ............................. | 707/4 |
| 2006/0288350 A1 * | 12/2006 | Grigorovitch ........ | G06F 9/5038 718/107 |
| 2006/0291505 A1 * | 12/2006 | Li .................................. | 370/474 |
| 2008/0002702 A1 * | 1/2008 | Bajic et al. ..................... | 370/392 |
| 2008/0151101 A1 * | 6/2008 | Tian et al. ...................... | 348/448 |
| 2008/0247663 A1 * | 10/2008 | Jacobsen ........... | G06F 17/30805 382/266 |
| 2009/0083516 A1 * | 3/2009 | Saleem et al. .................. | 712/28 |
| 2009/0154572 A1 * | 6/2009 | Baik ....................... | G06F 9/5088 375/240.25 |
| 2009/0265384 A1 * | 10/2009 | Xu ..................... | G06F 17/30017 |
| 2010/0131955 A1 * | 5/2010 | Brent et al. .................... | 718/103 |
| 2011/0154355 A1 * | 6/2011 | Becker .................. | G06F 9/5027 718/104 |
| 2011/0161979 A1 * | 6/2011 | Flemming et al. ............. | 718/105 |

* cited by examiner

*Primary Examiner* — Abu Ghaffari
(74) *Attorney, Agent, or Firm* — NSIP Law

(57) ABSTRACT

A multimedia data preprocessing apparatus for a virtual machine is provided. The multimedia data preprocessing apparatus includes a detection unit configured to detect multimedia data included in an application, a generation unit configured to generate a thread for processing the detected multimedia data, and an allocation unit configured to allocate the generated thread to an idle core.

15 Claims, 4 Drawing Sheets

MULTIMEDIA DATA PRE-PROCESSING ON IDLE CORE BY DETECTING MULTIMEDIA DATA IN APPLICATION

CROSS-REFERENCE TO RELATED APPLICATION(S)

This application claims the benefit under 35 U.S.C. §119(a) of Korean Patent Application No. 10-2011-0005142, filed on Jan. 18, 2011, in the Korean Intellectual Property Office, the entire disclosure of which is incorporated herein by reference for all purposes.

BACKGROUND

1. Field

The following description relates to a multimedia pre-processing apparatus and a method for virtual machine in multicore device.

2. Description of the Related Art

A virtual machine (VM) is a technique of executing an application in a device equipped with heterogeneous central processing units (CPUs) and memories.

Code written in a high-level language may be distributed as a script or hardware-independent intermediate code, and may be executed by interpreters or the machine language translators of VMs installed in various devices.

Examples of a virtual machine include a Java virtual machine, which is widely used in mobile phones, digital TVs or the like, a JavaScript whose code is transmitted via the web, and a Dalvik virtual machine.

Various applications may be executed in various embedded devices (such as mobile phones or digital TVs), servers, desktops and the like using virtual machines. However, not all distributed applications use all the CPU resources of devices where they are executed when operating.

Not only servers or desktops but also embedded devices may use multicore CPUs equipped with two or more independent cores.

Multicore devices may execute a plurality of applications at the same time more quickly than single-core devices. In multicore environments, each core may distribute CPU tasks in an operating system (OS).

However, this method may not properly distribute tasks. Thus, effectively distributing tasks in a virtual machine environment is necessary.

An application may include execution code and various multimedia data such as video data, audio data, image data, text and the like. The execution code may define the operation of the application. The application may be executed using the execution code. In response to the application being executed, the multimedia data may be output.

Multimedia data has a relatively large size, and is generally distributed in an encoded form. In order to output the multimedia data, the multimedia data may need to be loaded and decoded before being output. However, the decoding of multimedia data results in a large overhead especially in embedded devices with a limited CPU and a limited amount of memory space.

SUMMARY

In one general aspect, a multimedia data preprocessing apparatus for a virtual machine in multicore device is provided. The multimedia data preprocessing apparatus includes a detection unit configured to detect multimedia data included in an application, a generation unit configured to generate a thread for processing the detected multimedia data, and an allocation unit configured to allocate the generated thread to an idle core.

The detection unit may identify multimedia data attributes included in code or metadata of the application and detect the multimedia data included in the application based on the identified multimedia data attributes.

The generated thread may decode the detected multimedia data into code that is capable of being processed by the application.

The detection unit may identify code or metadata of the application and detect a multimedia data attributes from the identified application code or metadata.

The generated thread may load multimedia data corresponding to the detected multimedia data attributes and decode the loaded multimedia data into code that is capable of being processed by the application.

The allocation unit may allocate the generated thread to an idle core other than a core executing the application.

The allocation unit may allocate the generated thread to a core executing the application in response to the core becoming idle.

The multimedia data preprocessing apparatus may include a storage unit configured to store processed multimedia data obtained by processing the detected multimedia data based on the generated thread.

The storage unit may store the processed multimedia data in a data structure that is capable of being used in the application.

The detected multimedia data may include video data, audio data, image data, text data, or any combination thereof.

In response to an execution of the application being complete, the allocation unit may remove the thread allocated to the idle core.

In response to an execution of the application being complete, the storage unit may delete the multimedia data stored therein.

The multimedia data preprocessing apparatus may include a plurality of cores.

In another aspect, a multimedia data preprocessing method for a virtual machine is provided. The multimedia data preprocessing method includes detecting multimedia data included in an application, generating a thread for processing the detected multimedia data, and allocating the generated thread to an idle core.

The multimedia data preprocessing method may include determining whether the detected multimedia data is decoded.

The detecting the multimedia data may include detecting a multimedia data attribute in code or metadata of application.

The generated thread may load multimedia data corresponding to the detected multimedia is data attribute and decode the loaded multimedia data into code that is capable of being processed by the application.

The multimedia data processing method may include storing processed multimedia data obtained by processing the detected multimedia data using the generated thread.

The detected multimedia data may include video data, audio data, image data, text data, or any combination thereof.

In yet another aspect, a multimedia data preprocessing method for a virtual machine in multicore device is provided. The multimedia data preprocessing method includes receiving a call for multimedia data from an application, determining whether the multimedia data is decoded, and in a case in which the multimedia data is stored, returning the stored multimedia data to the application.

In yet another aspect, a multimedia data preprocessing apparatus for a virtual machine in a multicore device is provided. The multimedia data preprocessing apparatus includes a generation unit configured to generate a thread for processing multimedia data, an allocation unit configured to allocate the generated thread to an idle core, and a detection unit configured to detect multimedia data included in an application from the generated thread.

Other features and aspects may be apparent from the following detailed description, the drawings, and the claims.

Figure 1:
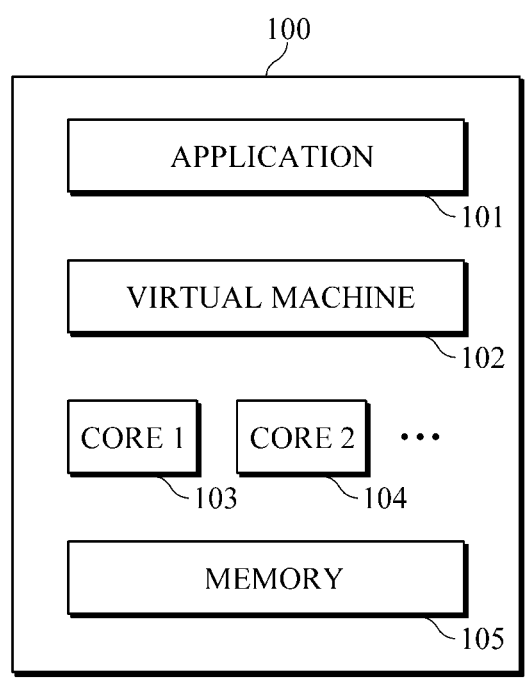
FIG. 1 is a diagram illustrating an example of a multicore system for preprocessing multimedia data.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining an understanding of the methods, apparatuses, and/or systems described herein. Accordingly, various changes, modifications, and equivalents of the methods, apparatuses, and/or systems described herein is suggested. Also, descriptions of well-known functions and constructions may be omitted for increased clarity and conciseness.

FIG. 1 illustrates an example of a multicore system for preprocessing multimedia data.

Referring to FIG. 1, multicore system 100 may include a plurality of cores 103, 104, . . . , and a memory 105. In the multicore system 100, an application 101 and a virtual machine 102 that helps executing the application 101 may operate.

In response to the application 101 being executed in the multicore system 100, an execution code of the application 101 may be allocated to the main core 103 via the virtual machine 102.

In response to the application 101 being executed, the virtual machine 102 may generate a thread for processing (for example, decoding) multimedia data included in the application 101, and may allocate the generated thread to a core other than the main core 103 currently executing the application 101, for example, the core 104.

A low priority level or a lowest priority level may be allocated to the thread allocated to the core 104 such that the executing of the application 101 by the main core 103 may avoid interference by the thread allocated to the core 104. In other words, the main core 103 has a higher priority level than the core 104.

Before being requested by the application 101, the multimedia data included in the application 101 may be preprocessed through the thread allocated to the core 104. Thus, returning the preprocessed multimedia data to the application 101 at any time required by the application 101 is possible.

For example, the thread allocated to the core 104 may be involved in decoding the multimedia data included in the application 101 ahead of the use of the corresponding multimedia data by the application 101 in order to be capable of being able to readily return the decoded multimedia data to the application 101.

The decoding of the multimedia data included in the application 101 by the thread allocated to the core 104 may be performed using a multimedia data loading-related application programming interface (API) and a decoding-related API in the virtual machine 102.

By preprocessing the multimedia included in the application 101, improving the general operating speed of the application 101 and the general performance of the multicore system 100 is possible.

Figure 2:
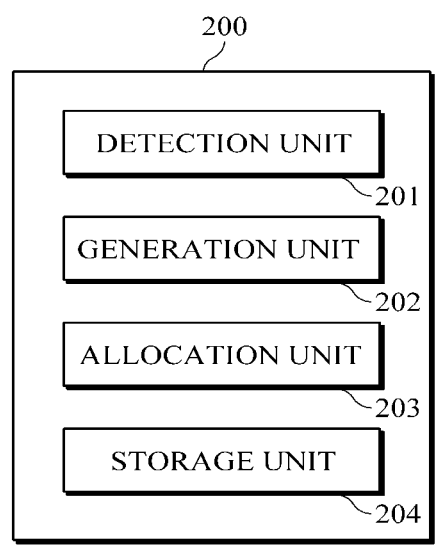
FIG. 2 is a diagram illustrating an example of a multimedia data preprocessing apparatus.

FIG. 2 illustrates an example of a multimedia data preprocessing apparatus.

Referring to FIG. 2, multimedia data preprocessing apparatus 200 may include a detection unit 201, a generation unit 202, an allocation unit 203, and a storage unit 204.

The detection unit 201 may detect multimedia data included in a predetermined is application.

The multimedia data may include video data, audio data, image data, text data, or any combination thereof.

The multimedia data may be output or played during the execution of the predetermined application, and may be encoded in installation information of the predetermined application.

In response to the predetermined application being executed by a main core, the detection unit 201 may identify the code of the predetermined application, and may detect the multimedia data from the predetermined application.

The detection unit 201 may detect the multimedia data from the code of the predetermined application based on the attributes of the multimedia data.

For example, the attributes of the multimedia data may include the name and extension of the multimedia data. In another non-limiting example, the detection unit 201 may detect the multimedia data from the predetermined application by detecting a multimedia data attribute from the code of the predetermined application or the application metadata and loading the multimedia data corresponding to the identified multimedia data attribute from the installation information of the predetermined application. The application metadata may be data that is stored in advance by, for example, a manufacturer, in connection with the predetermined application. For example, the application metadata may include the name or the extension of multimedia data.

The generation unit 202 may generate a thread for processing the multimedia data, which is encoded. The thread may decode the multimedia data into code that may be processed by the predetermined application.

The multimedia data, which may be large in size, may be encoded in the installation information of the predetermined application, and may need to be decoded before being output or played.

In response to a multimedia data attribute_being detected, the detection unit 201 may load multimedia data corresponding to the detected multimedia data attribute_from the installation information of the predetermined application, and may decode the loaded multimedia data into code that may be processed by the predetermined application.

The allocation unit 203 may search for an idle core and may allocate the thread generated by the generation unit 202 to the idle core.

The idle core may be a core other than the main core.

In response to the thread generated by the generation unit 202 being allocated to the idle core, the idle core may be a core other than the main core.

In a case in which the predetermined application stops executing for more than a predetermined amount of time, the detection unit 201 may detect the multimedia data included in the predetermined application.

The generation unit 202 may generate a thread for decoding the multimedia data detected by the detection unit 201.

The allocation unit 203 may allocate the generated thread to an idle core to which an application that stops executing is allocated, for example, a core having an idle time, and may thus allow the idle core to decode the multimedia data detected by the detection unit 201.

The storage unit 204 may store the decoded multimedia data, and may return the decoded multimedia data upon the request of the predetermined application.

For example, the storage unit 204 may store the decoded multimedia data in a data structure that may be utilized by the predetermined application.

As described above, multimedia data detected from an application may be preprocessed through the execution of a thread by an idle core during the execution of the application by a main core, and the preprocessed multimedia data may be stored. By using the preprocessed multimedia data, improving the operating speed of the application and the general operating efficiency of a multicore system is possible.

The preprocessing of multimedia data in an application may be described as processing the multimedia data in advance of the use of the multimedia data by the application and thus may be effective in response to the application being complete. In other words, once the application is complete, the multimedia data may be of no use any longer.

Thus, in response to the predetermined application being complete, the allocation unit 203 may terminate or remove the thread allocated to the idle thread. In addition, in response to the predetermined application being complete, the storage unit 204 may delete the preprocessed multimedia data stored therein. By deleting unnecessary data in a memory, securing and maintaining sufficient memory space in a multicore system is possible.

Figure 3:
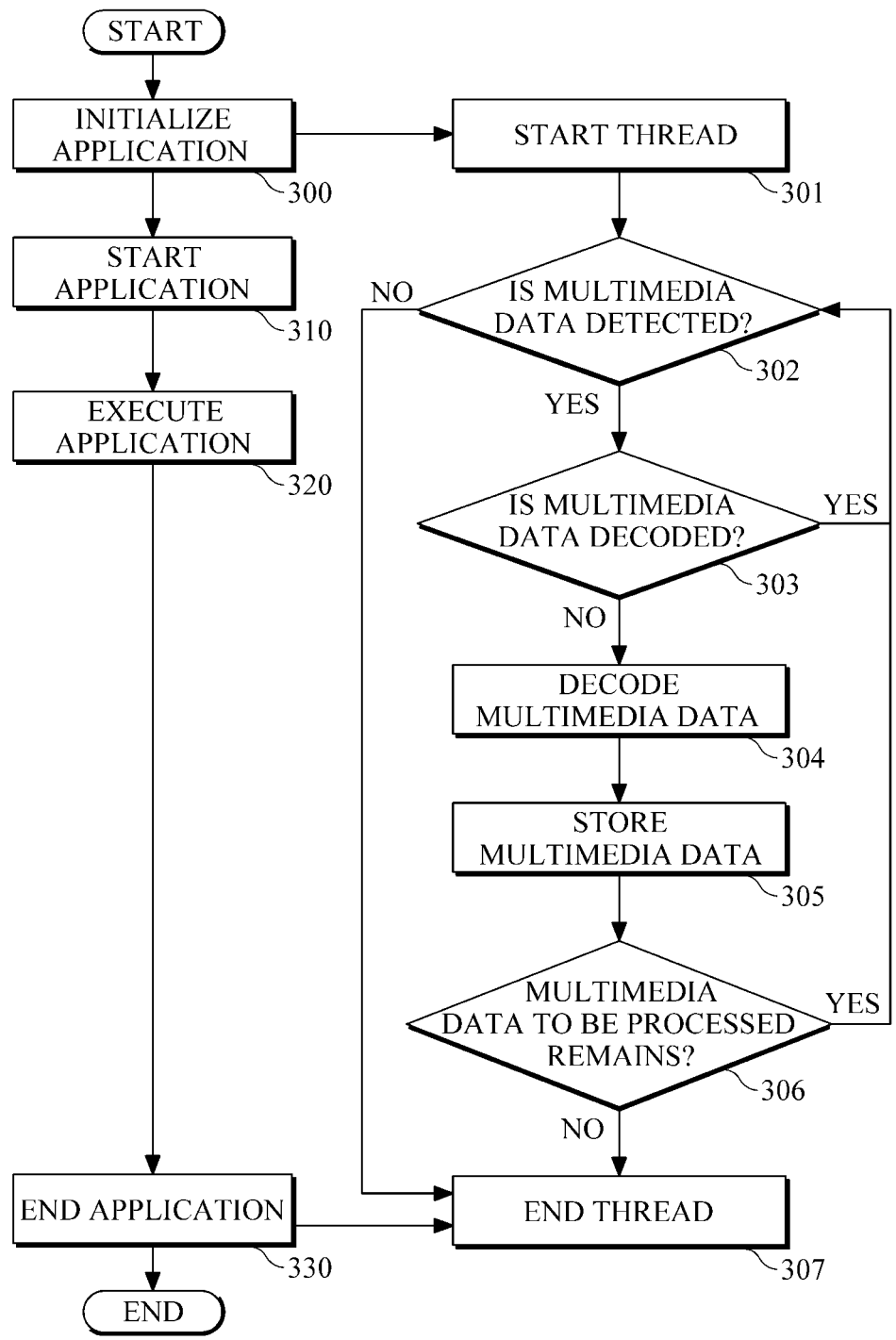
FIG. 3 is a flowchart illustrating an example of a multimedia data preprocessing method.

FIG. 3 illustrates an example of a multimedia data preprocessing method.

The multimedia data preprocessing method may include processing in advance multimedia data to be used during the execution of an application, and may be performed during the execution of the application.

Referring to FIG. 3, in operation 300, an application may be allocated to a main core and may be initialized, and at substantially the same time, in operation 301, a thread for processing multimedia data may be generated and may begin executing.

In operations 310 and 320, the application may begin executing, and at substantially the same time, in operation 302, the attribute of the application may be identified, and multimedia data included in the application may be detected. In response to no multimedia being detected, the multimedia data preprocessing method may return to 307.

In response to the multimedia data being detected from the application, a multimedia data attribute_may be detected from the code or metadata of the application, and multimedia data corresponding to the detected multimedia data attribute may be loaded from installation information of the application, thereby acquiring the multimedia data included in the application.

The multimedia data included in the application may be detected based on a multimedia data name or extension included in the code or metadata of the application.

In operation 303, in response to multimedia data being detected, determining whether the detected multimedia data is decoded may occur. In operation 303, in response to the detected multimedia data being decoded, the multimedia preprocessing method may return to operation 302. In operation 304, in response to the detected multimedia data not being decoded, the detected multimedia data may be decoded using the generated thread.

The generated thread may decode multimedia data into code that may be processed by the application.

In operation 305, the decoded multimedia data may be stored for later use in the application.

In operation 306, determining whether there remains multimedia data to be processed. In response to remain multimedia data to be processed, the multimedia data preprocessing method may return to 302. On the other hand, in response to no multimedia data being detected from the application, the multimedia preprocessing method may proceed to operation 307.

In operation 307, the generated thread may be ended.

The multimedia preprocessing method may be effective during the execution of the application, for example, operations 310 and 320, because the multimedia preprocessing method is for processing in advance multimedia data to be used in the application.

Thus, in operation 330, in response to the application being complete, the generated thread may be terminated.

Figure 4:
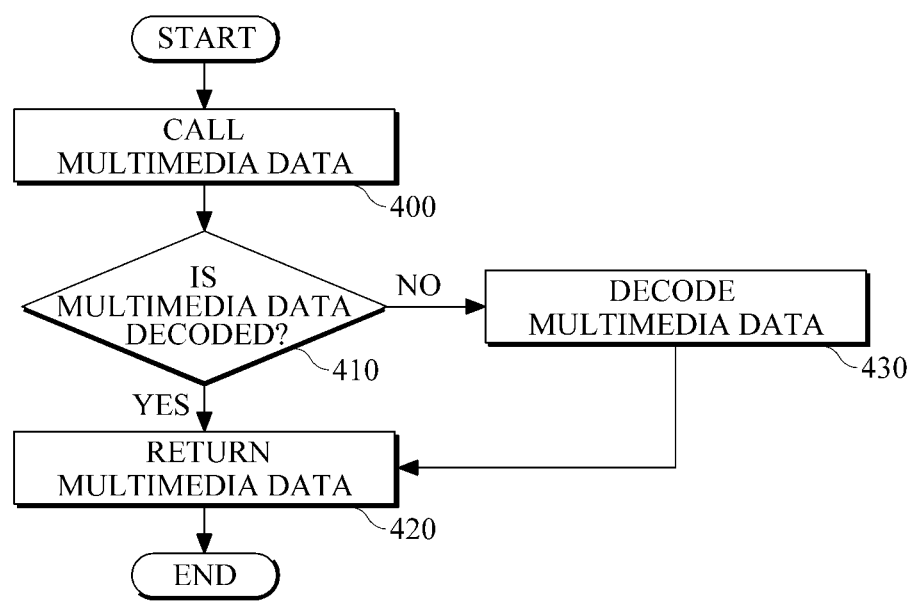
FIG. 4 is a flowchart illustrating an example of a method of returning preprocessed multimedia data to an application.

FIG. 4 illustrates an example of a method of returning preprocessed multimedia data to an application.

As described above with reference to FIG. 3, in response to an application being executed, a thread may be generated and may begin to operate. The thread may decode in advance multimedia data included in the application and may store the decoded multimedia data. The decoded multimedia data may be returned to the application upon the request of the application, and this returning will be described with reference to FIG. 4.

Referring to FIG. 4, in operation 400, in a case in which there is a need to output multimedia data during the execution of an application, the application issues a request for the multimedia to a virtual machine.

For example, in an effort to play a video during the execution of the application, the application issues a request for the video to the virtual machine so that the virtual machine may return the video to the application in the form of code that may be readily processed by the application.

In operation 410, the virtual machine may determine whether the multimedia is decoded. In operation 420, in response to the multimedia data being decoded, the virtual machine may return the multimedia data to the application.

Since the application is provided with the multimedia data as code that may be readily output, the application may readily output the multimedia data without requiring additional processing.

For example, the virtual machine may provide the application with a video that is decoded and may thus be readily played without requiring additional processing. Since the video is provided in the form of code that may be readily played by the application, the application may readily play the video.

In operation 430, in response to the multimedia data not being decoded, the virtual machine decode the multimedia data immediately without generating a thread for processing the multimedia data. In operation 420, the virtual machine may return the decoded multimedia data to the application.

In response to the multimedia data not being decoded, the virtual machine may need to decode the multimedia data. During the decoding of the multimedia data, the application may stop executing or may be placed in an idle state.

Examples of devices that may include a virtual machine include a mobile phone, a television, computer monitor, desktops and the like.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multimedia data preprocessing apparatus comprising:
a multicore device comprising a first processing core and a second processing core, the first processing core being configured to execute an application; and
at least one processor configured to implement
a detector configured to detect multimedia data included in the application, to detect a multimedia data attribute from either a metadata or a code of the application based on the detected multimedia data, and to acquire the multimedia data included in the application corresponding to the detected multimedia data attribute,
a generator configured to generate a thread configured to process the detected multimedia data, and
an allocator configured to allocate the generated thread to the second processing core during the execution of the application in response to the second processing core becoming idle so that the thread is executed by the second processing core in advance of the application using the detected multimedia data,
wherein the generated thread is configured to determine if the multimedia data requires preprocessing, and the generated thread returns the preprocessed multimedia data to the application.

2. The multimedia data preprocessing apparatus of claim 1, wherein the generated thread decodes the detected multimedia data into code that would be processed by the application.

3. The multimedia data preprocessing apparatus of claim 1, wherein the generated thread loads multimedia data corresponding to the detected multimedia data attribute and decodes the loaded multimedia data into the code that would be processed by the application.

4. The multimedia data preprocessing apparatus of claim 1, further comprising a data store configured to store processed multimedia data obtained by processing the detected multimedia data based on the generated thread.

5. The multimedia data preprocessing apparatus of claim 4, wherein the data store is configured to store the processed multimedia data in a data structure that would be used in the application.

6. The multimedia data preprocessing apparatus of claim 4, wherein in response to an execution of the application being complete, the data store is configured to delete the stored multimedia data.

7. The multimedia data preprocessing apparatus of claim 1, wherein the detected multimedia data comprises at least one of video data, audio data, image data, and text data.

8. The multimedia data preprocessing apparatus of claim 1, wherein in response to an execution of the application being complete, the allocator is configured to remove the thread allocated to the idle core.

9. A multimedia data preprocessing method comprising:
executing an application in a first processing core of a multicore device;
detecting multimedia data included in the application, to detect a multimedia data attribute from either a metadata or a code of the application based on the detected multimedia data, and to acquire the multimedia data included in the application corresponding to the detected multimedia data attribute;
generating a thread configured to process the detected multimedia data; and
allocating the generated thread to a second processing core of the multicore device during the execution of the application in response to the second processing core becoming idle so that the thread is executed by the second processing core in advance of the application using the detected multimedia data,
wherein the generated thread is configured to determine if the multimedia data requires preprocessing, and the generated thread returns the preprocessed multimedia data to the application.

10. The multimedia data preprocessing method of claim 9, further comprising determining whether the detected multimedia data is decoded.

11. The multimedia data preprocessing method of claim 9, wherein the generated thread loads multimedia data corresponding to the detected multimedia data attribute and decodes the loaded multimedia data into the code that would be processed by the application.

12. The multimedia data processing method of claim 9, further comprising storing processed multimedia data obtained by processing the detected multimedia data using the generated thread.

13. The multimedia data preprocessing method of claim 9, wherein the detected multimedia data comprises at least one of video data, audio data, image data, and text data.

14. A multimedia data preprocessing method comprising:
executing an application in a first processing core of a multicore device;
detecting multimedia data included in the application, to detect a multimedia data attribute from either a metadata or a code of the application based on the detected multimedia data, and to acquire the multimedia data included in the application corresponding to the detected multimedia data attribute;
generating a thread to decode the detected multimedia data;
allocating the generated thread to a second processing core of the multicore device during the execution of the application in response to the second processing core becoming idle so that the thread is executed by the second processing core in advance of the application using the detected multimedia data;
receiving a call for decoded multimedia data from the application;
determining whether the multimedia data is decoded; and
in response to the multimedia data being decoded, returning the decoded multimedia data to the first processing core,
wherein the generated thread is configured to determine if the multimedia data requires preprocessing, and the generated thread returns the preprocessed multimedia data to the application.

15. A multimedia data preprocessing apparatus comprising:
a multicore device comprising a first processing core and a second processing core, the first processing core being configured to execute an application; and
at least one processor configured to implement
a generator configured to generate a thread configured to process multimedia data included in the application,
an allocator configured to allocate the generated thread to the second processing core during the execution of the application in response to the second processing core becoming idle so that the thread is executed by the second processing core in advance of the application using the multimedia data included in the application, and
a detector configured to detect the multimedia data included in the application from the generated thread, to detect a multimedia data attribute from either a metadata or a code of the application based on the detected multimedia data, and to acquire the multimedia data included in the application corresponding to the detected multimedia data attribute,
wherein the generated thread is configured to determine if the multimedia data requires preprocessing, and the generated thread returns the preprocessed multimedia data to the application.

* * * * *